Dec. 26, 1961  D. S. CUSHING ET AL  3,015,055
SELF-STARTING INDUCTION MOTOR
Filed Jan. 4, 1960  3 Sheets-Sheet 2
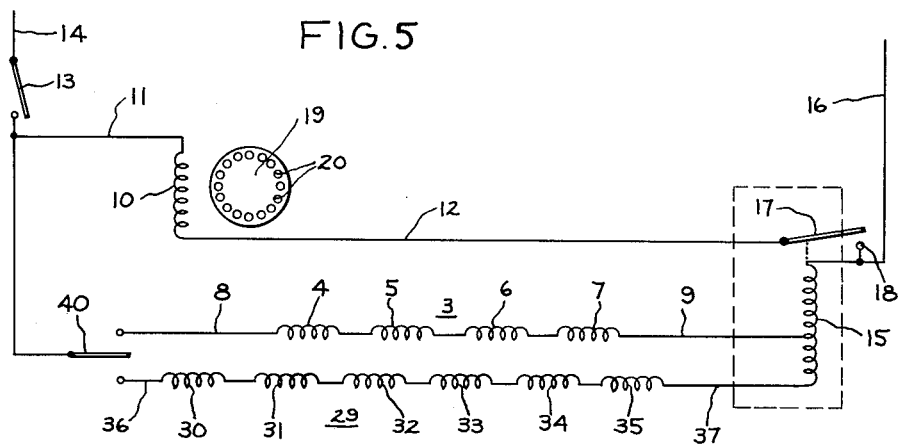
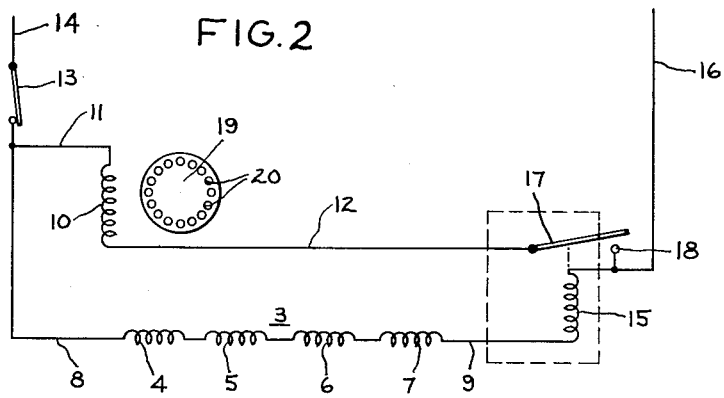
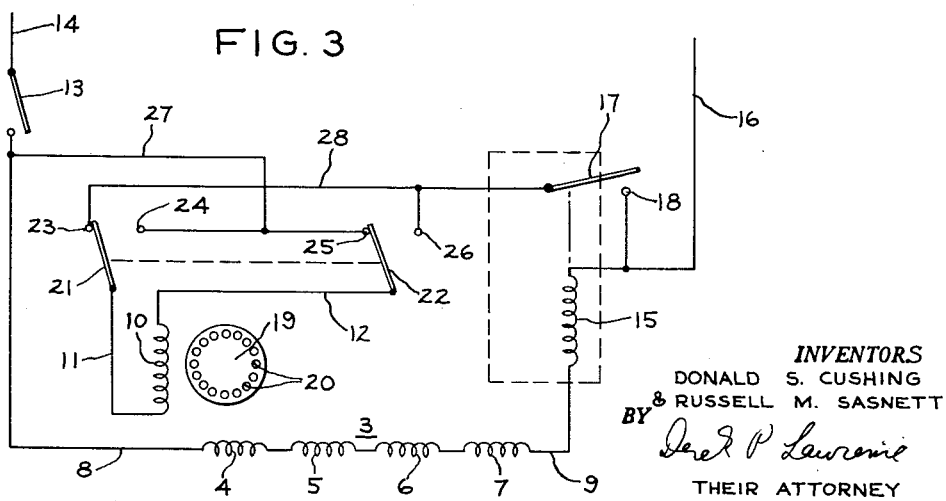
INVENTORS
DONALD S. CUSHING
& RUSSELL M. SASNETT
BY
THEIR ATTORNEY … # 3,015,055
SELF-STARTING INDUCTION MOTOR
Donald S. Cushing and Russell M. Sasnett, Louisville, Ky., assignors to General Electric Company, a corporation of New York
Filed Jan. 4, 1960, Ser. No. 310
6 Claims. (Cl. 318—207)

This invention relates to dynamoelectric machines, and more particularly to self-starting induction-type alternating-current electric motors.

There are many applications for self-starting induction-type alternating-current electric motors where the starting torque requirements of the motor are, actually, more than met by the conventional arrangement which provides a starting winding having the same number of coils and poles as the main winding of the motor. This, for instance, occurs quite frequently in appliances such as dishwashers and the like. Accordingly, it is most desirable to provide a motor in which the expense of the conventional starting winding is eliminated yet which will nonetheless be self-starting with adequate torque characteristics to effect the desired purpose.

It is, therefore, an object of this invention to provide an improved induction-type alternating-current motor of the self-starting type having the advantageous feature set forth above.

A further more specific object of our invention is to provide a self-starting induction-type motor wherein the starting winding consists of a single pole located about 90 electrical degrees away from and between two of the main winding poles and which, when the windings are energized, creates its own consequent poles on either side thereby to provide a rotating field while the motor is still stationary.

A further more specific object of this invention is to provide a construction including the single pole start winding described above in a reversing-type motor.

Yet a further object of the invention is to provide the single pole start winding described above in a two-speed motor having a separate main winding for each speed. When our improved construction is provided it avoids the need for a relatively expensive and complex centrifugal switch of the type which is required where, as is conventional, the two-speed motor is always started on the same one of the two speeds and then the connections are switched to provide the desired running speed.

In one aspect thereof, this invention provides an alternating-current induction-type motor having a stator core with a main winding arranged on the core to form a plurality of poles and a start winding arranged on the core so as to form a single pole which is displaced approximately 90 electrical degrees from two of the main winding poles. Also, suitable means responsive to motor speed, such as for instance a relay or a centrifugal switch, are arranged so as to de-energize the start winding after the motor has started. During energization of the start winding, the single pole will create for itself consequent poles on either side which are electrically removed from the main winding poles and which therefore provide a rotating electric field which causes starting of the motor in the well known manner.

The subject matter which forms this invention is particularly pointed out and distinctly claimed in the concluding portion of this specification. The invention itself, however, both as to organization and method of operation together with further objects and advantages, may best be understood by reference to the following description when taken in conjunction with the accompanying drawings.

In the drawings:

FIGURE 2 is a schematic diagram of motor windings connected in a circuit suitable for a single directional motor arranged according to the invention;

FIGURE 3 is a schematic diagram of the windings of our improved motor when connected in a circuit suitable for use in a reversing motor circuit;

FIGURE 5 is a schematic diagram of the windings of the stator core of FIGURE 4 when connected in a circuit suitable for a two-speed single direction motor.

Figure 1:
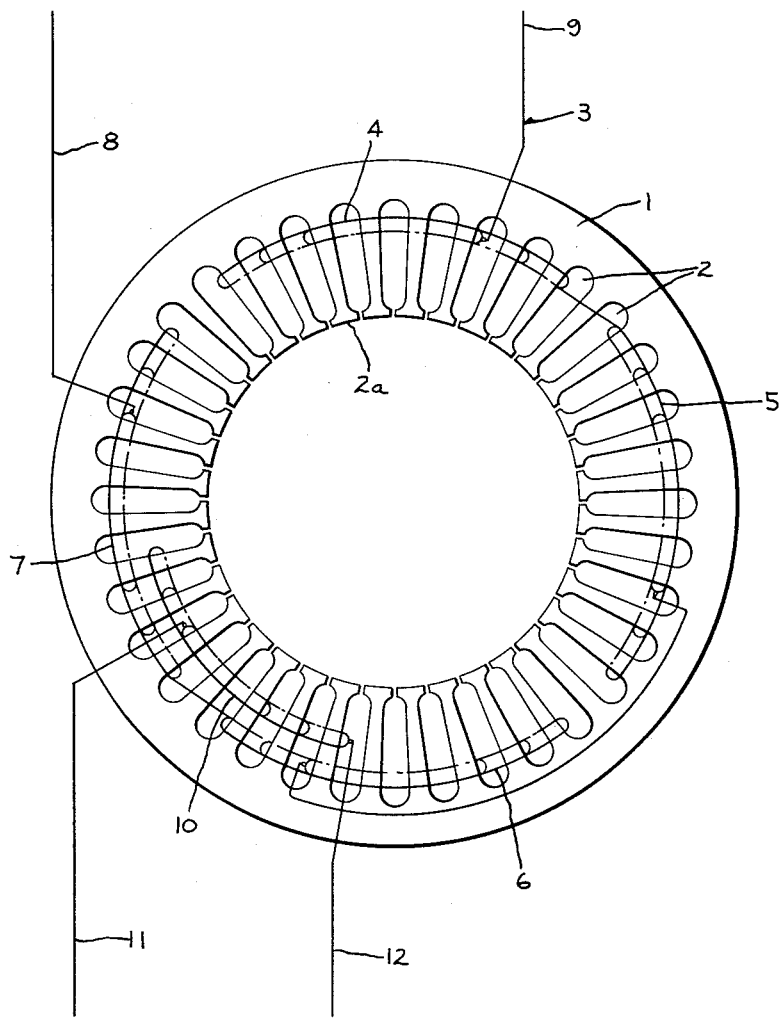
FIGURE 1 is a schematic diagram of the winding distribution on a stator core in the improved induction motor of our invention.

Referring now to FIGURE 1 of the drawing, an induction-type motor is provided with a stator core 1 generally formed of a stacked plurality of thin laminations of magnetic material. A plurality of slots 2 are formed in the core 1 around its bore 2a to receive the motor windings. A running winding 3 is formed into four poles 4, 5, 6 and 7 and is adapted to be connected across a source of alternating current, through a pair of leads 8 and 9. A start winding 10 is also provided and has a single pole wound in slots 2 so as to be 90 electrical degrees removed from the main winding, i.e., located directly between two of the main winding poles. In addition, the two windings 3 and 10 are displaced in phase, either by suitable additional means such as a capacitor in series with one of them or by their own different electrical characteristics.

Referring now to FIGURE 2 of the drawings, the four poles 4, 5, 6 and 7 of the main winding 3 are connected across a source of power; on one side they are connected to the source of power through a main switch 13 and a conductor 14, while on the other side the connection extends through a relay coil 15 and a conductor 16. The start winding 10 is connected in parallel with the main winding and in series with main switch 13. Also, in series with the start winding is a contact arm 17 controlled by coil 15 so that, when a relatively high current passes through the main winding 3 and coil 15, it causes the contact arm 17 to engage contact 18 and thereby complete an energizing circuit for the start winding 10. At other times, i.e., when less or no current passes through coil 15, contact arm 17 is separated from contact 18.

The amount of current passing through the main winding 3 is, as is well known, controlled to a substantial extent by the rate of rotation of the rotor 19, schematically illustrated as having squirrel cage bars 20 connected together at their ends (not shown) to form a plurality of closed conducting loops. When the rotor, which is conventionally positioned within bore 2a of stator 1, is stationary or rotating at a relatively low speed the current passing through the main winding 3 is relatively high thereby causing a high current in coil 15 and the closing of relay contact arm 17. This completes an energizing circuit for start winding 10; as the rotor comes up to speed, the current in the main winding drops and the current passing through the coil 15 then becomes insufficient to maintain the relay contact arm 17 closed. As a result, contact arm 17 opens, de-energizing the start winding 10. This circuitry is conventional, and it will be readily understood that instead of the relay arrangement shown in centrifugal switch may be used with equal success in controlling the energization of start winding 10, the centrifugal switch merely being a mechanical speed sensitive arrangement provided in lieu of the electrical speed sensitive arrangement represented by relay 15.

Referring to FIGURES 1 and 2 together, when the switch 13 is closed to start the motor, there is a relatively high surge of current through main winding 3 which closes the contact arm 17 upon contact 18 to provide for energization of start winding 10. Upon energization of winding 10, the single pole thereof causes consequent poles to be created on either side of it, which consequent poles are electrically displaced from the main winding 3 so that a rotating field is thereby created to cause the motor 19 to start rotating. In this manner, by use of a single pole start winding, a self-starting electric motor is provided.

Referring now to FIGURE 3, there is shown a circuit which is appropriate for causing the stator of FIGURE 1 to provide a reversing action in instances where a motor rotatable in either direction is desired. In the circuit of FIGURE 3, the conductors 11 and 12 extending from the winding 10 are connected respectively to contact arms 21 and 22. Contact arm 21 is engageable with either contact 23 or contact 24 while contact arm 22 is engageable with either of contacts 25 and 26, the two contact arms being ganged together so that contacts 23 and 25 are engaged simultaneously and contacts 24 and 26 are engaged simultaneously. It will readily be seen that with the contact arms in the position shown, the connection of the start winding 10 across the line extends from conductor 14 and switch 13 through a conductor 27, contact 25, contact arm 22, the start winding 10, contact arm 21 and contact 23 to conductor 28, and then through the relay contact 17 to the conductor 16. With this connection, the start winding 10 has a predetermined polarity with respect to the main winding 3 and the motor will rotate in a predetermined direction upon energization of the windings.

If, however, the motor is energized with the contact arms 21 and 22 engaging contacts 24 and 26 respectively, the circuit then extends from conductor 27 through contact 24 and contact arm 21, the start winding 10, contact arm 22 and contact 26, and through the relay contact arm 17 to the conductor 16. In this position, it can be seen that the connections of the start winding are reversed and that therefore, with an opposite polarity relative to the main winding to that which it had before, the start winding will cause an opposite direction of rotation upon energization of the windings. Thus, the single pole start winding 10 is also effective to provide a reversing motor of the self-starting type.

Figure 4:
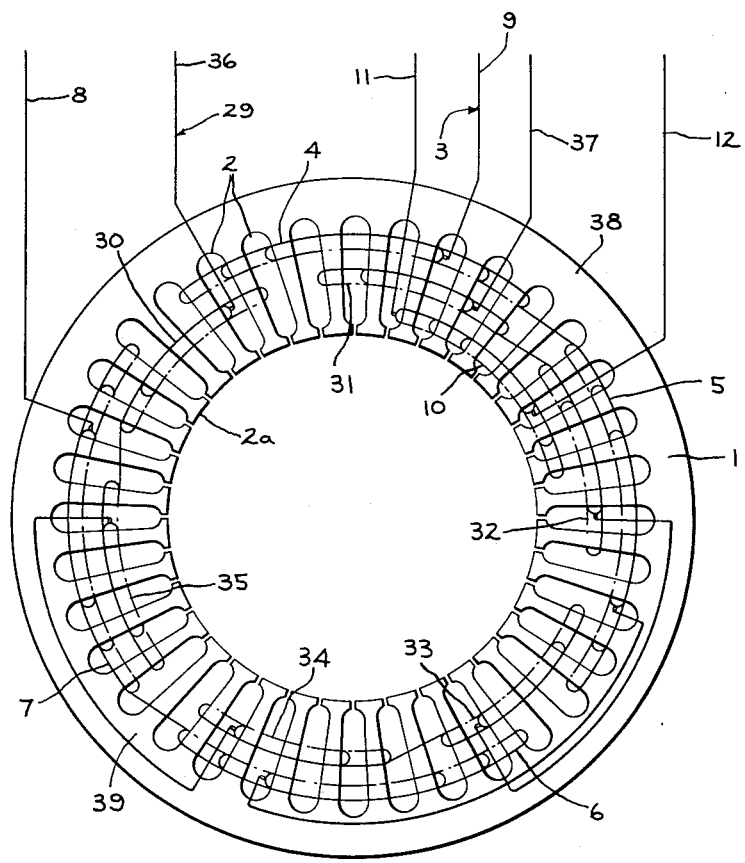
FIGURE 4 is a schematic diagram of the winding distribution in a stator core of a second embodiment of our invention.

Referring now to FIGURE 4 in combination with FIGURE 5, another embodiment of the invention is shown with like numerals being used to describe like parts. With particular reference to FIGURE 4, it will be seen that the four pole main winding 3 and the single pole start winding 10 are provided in the same relationship as before, that is, with the starting winding 10 located between two of the main winding poles, 90 electrical degrees removed therefrom. In addition, in the construction of FIGURE 4, a second main winding 29 having six poles 30, 31, 32, 33, 34 and 35 is provided with connections 36 and 37 extending therefrom. The winding arrangement is the conventional one for four pole and six pole windings provided on the same stator core. At only two positions, indicated respectively by the numerals 38 and 39, does it occur that a position 90 electrical degrees removed from the adjacent poles of the four pole winding is also 90 electrical degrees removed from the adjacent poles of the six pole winding.

We have provided at one of those locations our starting winding 10 which is thus, regardless of which of the main winding should be energized, 90 electrical degrees removed therefrom. Referring now to FIGURE 5 it can be seen that substantially the same type of circuit is provided as in connection with the structure of FIGURE 2 with the main exceptions that the two main windings are provided so as to be alternatively selected by a switch 40, and so that the four pole main winding 3 is tapped into the relay coil 15 at a position intermediate the ends of the coil. In all other respects the arrangement is similar, with the relay coil, or at least a part thereof, being in series with the selected energized main winding and with the controlled relay contact arm 17 being in series with the start winding 10.

When the switch 40 is in the down position, connected to winding 29, and the main switch 13 is closed, the energization and starting of the motor is effected precisely the same as before with the winding 10 being 90 electrical degrees removed from the energized main winding and forming consequent poles to effect a starting torque. As the motor comes up to speed, the current through the relay coil 15 decreases to permit the contacts 17 to open and deenergize the starting winding 10.

If now the higher speed, that is, the speed provided by the four pole winding, should be desired, the switch arm 40 is moved to its opposite position to engage the four pole winding 3. The current then passes through this winding and through the tapped portion of the relay coil 15. The relay coil 15 is shown as tapped based on the assumption that, as is conventional, the current characteristics of the two main windings 3 and 29 will vary (the four pole winding having, usually, higher current characteristics than the six-pole winding) and that therefore, in order to obtain with either main winding energization and de-energization of relay coil 15 effective to move contact arm 17, some tapping is desirable. It will, however, readily be observed that the windings may be formed to have the same current characteristics even though there are different numbers of poles and in that case no tapping would be necessary. Also, it will be understood that while a relay coil has been shown as one means of providing a simple speed responsive mechanism, a conventional simple centrifugal switch could also be provided as the means for de-energizing winding 10 as the motor comes up to speed.

Because the winding 10 is displaced electrically from the winding 20 in the same manner as it was from the winding 3, it will cooperate with the winding 29 to effect starting of the motor in the same manner. In other words, it is not necessary, as has generally previously been the case, to always cause the starting winding to cooperate with a particular one of the two main windings in a motor of this type and then, once the motor has come up to speed, switch the starting winding off and make a selection of the main winding which is to be used. This always required a rather complex type of centrifugal switch. On the contrary in this construction, a relay may be used or a simple centrifugal switch may be used because, regardless of which speed is selected, that is, which main winding is to be energized for running purposes, the start winding cooperates therewith to start the motor and, after that, is simply removed from the circuit rather than a switching of main windings being needed.

It will, of course, be understood that in the same manner that the circuits of FIGURES 2 and 3 were used to illustrate the possibility of making a reversing motor with the stator of FIGURE 1, the same type of connection may be used to make a reversing two-speed motor with the stator of FIGURE 4.

It will be observed from the foregoing that our invention provides an improved structure whereby a single pole start winding is all that is needed to effect starting. It will further be observed that this is particularly advantageous in two-speed motors where the particular location of the single pole of the start winding permits it to cooperate with either of the main windings so that starting may be effected on either main winding rather than always on the same main winding as has generally previously been true.

While the invention has been explained by describing particular embodiments thereof, it will be apparent that improvements and modifications may be made without departing from the scope of the invention as defined in the appended claims.

What we claim as new and desire to secure by Letters Patent of the United States is:

1. An alternating-current induction-type motor having a stator core, a main winding arranged on said core to form a plurality of poles, a start winding on said core having a single pole displaced approximately 90 electrical degrees from two of said main winding poles and therebetween, said windings being connected in parallel, and means responsive to motor speed arranged to de-energize said start winding after said motor has started.

2. The apparatus defined in claim 1 wherein said means responsive to motor speed includes a relay coil in series with said main winding and contacts controlled by said relay coil in series with said start winding, said relay coil closing said contacts at a relatively high current and opening said contacts at a relatively low current therethrough.

3. The apparatus defined in claim 1 including reversing switch means connected to said start winding and arranged to reverse the polarity of said start winding relative to said main winding for effecting opposite directions of rotation.

4. An alternating-current induction-type motor having a stator core, a first main winding arranged on said core to form a first predetermined number of poles, a second main winding arranged on said core to form a second different predetermined number of poles, said main windings being arranged on said stator so that at least one location thereon is 90 electrical degrees removed from the adjacent poles of each of said main windings, a start winding on said core having a single pole located at said single location, said start winding being connected in parallel with each of said main windings, means for selecting one of said main windings for energization with said start winding, and means responsive to motor speed arranged to de-energize said start winding after said motor has started.

5. The apparatus defined in claim 4 wherein said means responsive to motor speed includes a relay coil in series with said main windings and contacts controlled by said relay coil in series with said start winding, said contacts being closed when a relatively high current passes through said relay coil and opening when the current through said relay coil decreases to a predetermined level.

6. The apparatus defined in claim 5 wherein the main winding having the smaller number of poles is in series with all of said relay coil and the main winding having the larger number of poles is in series with only a portion of said relay coil.

References Cited in the file of this patent

UNITED STATES PATENTS 2,454,136     Carville ---------------- Nov. 16, 1948